United States Patent [19]

Gavin et al.

[11] 4,149,372
[45] Apr. 17, 1979

[54] FUEL RECLAIMING SYSTEM

[75] Inventors: John C. Gavin, Glastonbury; Clement A. Senatro, Newington, both of Conn.

[73] Assignee: United Technologies Corporation, Hartford, Conn.

[21] Appl. No.: 751,803

[22] Filed: Dec. 16, 1976

[51] Int. Cl.² .......................... F02C 7/22; F02C 9/12
[52] U.S. Cl. .................................. 60/39.09 R; 417/395
[58] Field of Search ................. 60/39.09 R, 39.09 F, 60/39.14; 137/202; 417/395, 435

[56] References Cited

U.S. PATENT DOCUMENTS

| | | | |
|---|---|---|---|
| 2,543,828 | 3/1951 | Brown | 417/395 |
| 3,421,448 | 1/1969 | Brewer et al. | 417/395 |
| 3,429,274 | 2/1969 | Nilsson | 417/395 |
| 3,841,089 | 10/1974 | Clark | 60/39.09 F |
| 3,901,025 | 8/1975 | Bryerton et al. | 60/39.09 F |

*Primary Examiner*—Louis J. Casaregola
*Attorney, Agent, or Firm*—Norman Friedland

[57] ABSTRACT

This invention relates to apparatus and means for reclaiming surplus fuel trapped in the fuel manifold system upon engine shutdown and includes a variable volume chamber operable as a function of and by motive power from the engine pneumatic starter and utilizes a valving system that prevents ingestion of air in the reclaimed fuel and is characterized by its complete automation, its relative simplicity and reduction in weight and size.

6 Claims, 2 Drawing Figures

FUEL RECLAIMING SYSTEM

BACKGROUND OF THE INVENTION

This invention relates to gas turbine engines for aircraft and means for reclaiming surplus fuel captured in the fuel manifold system incident engine shutdown.

This invention serves to solve the problem described in U.S. Pat. No. 3,841,089 granted to Herbert Clark on Oct. 15, 1974. As noted this patent describes a system that reclaims surplus fuel by collecting the fuel trapped in the fuel lines (nozzles, manifold, valve, etc.) upon the engine shutdown and inserting the fuel back into the fuel system by the continuous operation of a jet pump motivated by fuel upon starting the engine. However, the system described in U.S. Pat. No. 3,841,089, supra, incurs two distinct situations which may not in certain applications be tolerable. These are (1) the heat added to the fuel occasioned by the continuous operation of the injector pump and (2) the size of the drain tank which is dictated by the flow capacity of the jet pump and the amount of surplus fuel needed to be stored. If the engine is stopped and restarted a number of times for any of a number of reasons, as say for an abortive take-off and the capacity of the pump does not permit complete emptying of the drain tank in the allocated time, hence, the drain tank must be large enough to accommodate additional surplus fuel collected in the fuel system upon additional shutdowns. Obviously, repeated number of stop-go situations contemplated would dictate the storage capacity and 2 or 3 or better such go arounds are not unusual.

We have found that we can obviate the problems noted above, completely eliminate the jet pump and reclaim surplus fuel by a system that is characterized as being automatic, repeatable, and relatively simple with a relatively small drain tank, sized sufficiently cterized as being automatic, repeatable, and relatively simple with a relatively small drain tank, sized sufficiently to remove only the surplus fuel trapped in the fuel system for one stop-go situation. In addition this invention affords the following advantages to name but a few:

The system is completely isolated from the engine fuel system during all ground and flight operation of the aircraft.

The system is independent of and requires no alteration of the engine fuel system and/or starter.

The unit provides visual indication of whether or not the operation of waste fuel disposal system is satisfactory.

SUMMARY OF THE INVENTION

An object of this invention is to provide for an aircraft fuel system improved means for collecting and reclaiming fuel trapped in the fuel manifold system occasioned by engine shutdown.

A still further object of this invention is to provide a fuel reclaiming system that includes a variable volume chamber that operates as a function of and by the starter pneumatic system.

A still further object of this invention is to provide a fuel reclaiming system that includes a reciprocating piston and valving arrangement that collects the trapped fuel and pumps it back into the fuel system while assuring that air is not ingested into the fuel system, the volume of the cylinder need be only sufficient for one shutdown, and the reclaiming system is characterized as being relatively simple, low in weight, size and cost and completely automatic.

Other features and advantages will be apparent from the specification and claims and from the accompanying drawings which illustrate an embodiment of the invention.

DESCRIPTION OF THE PREFERRED EMBODIMENT

Figure 1:
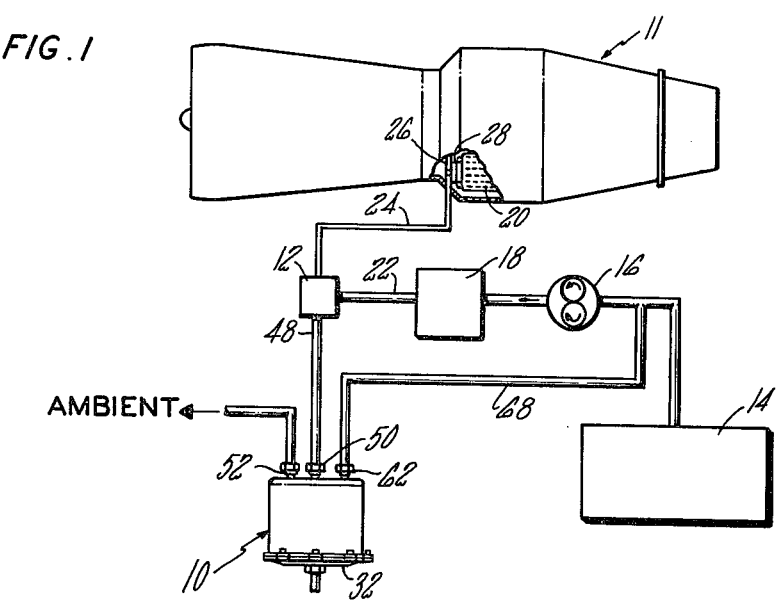
FIG. 1 is a schematic illustration of this invention.
Figure 2:
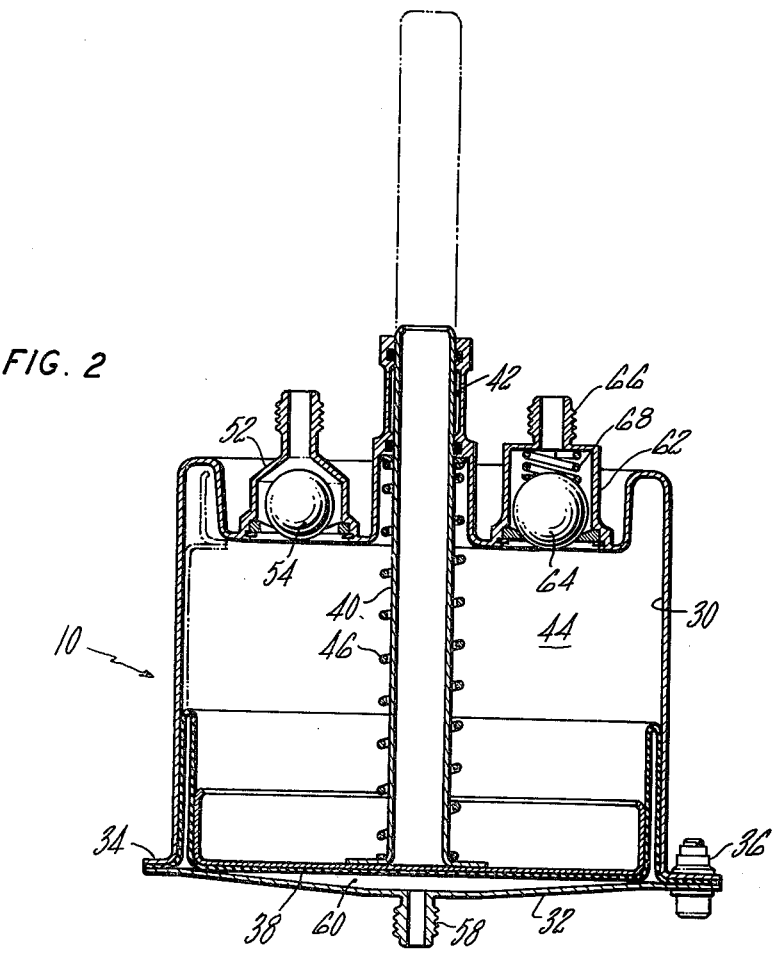
FIG. 2 is a sectional view showing the details of this invention.

As best shown in FIGS. 1 and 2 the fuel reclaiming system generally indicated by reference numeral 10 is connected to the pressurization and dump valve 12 customarily supplied in all jet engine powered aircraft installation. Briefly, the gas turbine engine when installed in the aircraft is connected to the fuel supply 14 and engine pump system 16 feeds the fuel control 18 for supplying the burner 20 with the proper amount of fuel. As noted the fuel is connected to the burner 20 to the fuel control 18 via conduit 22 and 24, manifold 26 and the fuel nozzles 28.

The pressurization and dump valve 12 serves to pressurize the fuel to a predetermined minimum value prior to it being conducted to the fuel nozzle and drain or dump fuel under certain conditions. The details of valve 12 are not important to the understanding of this invention and are omitted herefrom for the sake of simplicity, but they are commercially available and well known. Suffice it to say that upon shutdown, this valve prevents flow from reversing in conduit 22 back into the fuel control 18. In some installations pressurization and dump valve 12 includes a drain that when activated by the pilot would dump overboard all the fuel trapped between valve 12 and nozzles 28.

In accordance with this invention the fuel reclamation system 10 serves to collect this trapped fuel and return it to the pumps inlet to be inserted in the fuel system.

As noted in FIG. 2 the collection and reclamation system 10 includes cylinder 30 closed on both ends; the lower end may be closed by cover 32 suitably fastened to cylinder 30 at flange 34 by nut and bolt assemblies 36 (one being shown). Movable piston-diaphragm 38 assembly is suitably sandwiched between flange 34 and cover 32. Guide stem 40 slidably supported to the top of cylinder 30 through bore 42 provides a guide for piston 38 which is positioned rectilinearly to define variable volume chamber 44. Return spring 46 seated at the top end of cylinder 30 serves to position piston 38 in the lower, full volume position as shown in FIG. 2. Pressurized air from the air starter admitted to act behind piston 38 urges piston 38 upwardly for forcing the collected fuel and air through the valving system in a manner to be described hereinbelow.

In operation, fuel from the dump and pressurizing valve 12 when deactivated will permit the fuel trapped in the fuel manifold system to drain via line 48 into volume 44 of cylinder 30 via check valve 50 which is identical in construction to check valve 52. As noted, check valve 52 comprises float ball 54 and web-like constructed retainer 56 which permits flow to pass therethrough in the position shown. Volume 44 is sized to accommodate the amount of fuel trapped in the fuel manifold system upon engine shutdown, although it need not be.

Upon engine start up, a portion of the starter air bled from the engine starter system is routed through connector 58 into chamber 60 to act behind piston 38 urging it upwardly. The air on the top portion of the fuel escapes through check valve 52. As the fuel is forced upwardly and as the last of the air has escaped the float ball 54 of check valve 52 and the identical float ball (not shown) of check valve 50 seat against the conical surfaces of the respective valves effectuating a positive seal.

Check valve 62, comprising spring loaded ball 64 is urged away from its seat by the force exerted thereon by the fuel being forced by piston 38, causing the fuel to flow from connector 66 to the inlet of pump 16 via line 69 (FIG. 1). Upon the starter being deactivated the high pressure pneumatic system is shutdown and return spring 46 urges piston 38 back to the full volume position, as shown. Even before the starter is shut-off, in certain installations engine RPM will be at a point where the primary fuel pressure will become greater than the starter air pressure. At this point spring 68 will seat ball 62 preventing fuel from the pump inlet from back flowing to collector 10.

As noted, the guide shaft 40 is returned back into the cylinder where it is stored and kept fairly clean.

Ball 54 and the other ball for valve 50 are designed so that they have a relatively low specific gravity assuring that they will seat upon the fuel riding up in cylinder 30 and before ball 64 is opened. These balls may be hollow and similar to the float type used in conventional carburetors.

As apparent from the foregoing the air escaping through valve 52 is bled to ambient. If during engine operation, if the pump inlet pressure should be lower than ambient, spring loaded check valve 62 will prevent air being sucked into the inlet of pump.

It should be understood that the invention is not limited to the particular embodiments shown and described herein, but that various changes and modifications may be made without departing from the spirit or scope of this novel concept as defined by the following claims.

We claim:

1. For a gas turbine engine powered aircraft in which fuel is left over in fuel conducting lines upon shutdown of the engine, means for recycling this captured fuel including a variable volume enclosed chamber, having connection means to the fuel supply system, to the lines in which fuel is captured, and ambient, first valve means in said connection means being opened to communicate said variable volume enclosed chamber with said fuel conducting lines and closed when said variable volume enclosed chamber is being emptied, second valve means being opened to communicate said variable volume enclosed chamber with said fuel supply means when said variable volume enclosed chamber is being emptied and closed when said variable volume enclosed chamber is in the fully expanded state, means responsive to the starter of the engine for emptying said variable volume enclosed chamber, and third valve means communicating said variable volume enclosed chamber with ambient and closed when said second valve is in the opened position.

2. The invention as in claim 1 wherein said means responsive to the starter includes a force reaction surface having one face exposed to said variable volume enclosed chamber and an opposing face exposed to pressure manifested by said starter.

3. The invention as in claim 2 wherein a diaphragm extending across said chamber forms the reaction surface, means supporting said diaphragm including a rod supported in one end of said chamber, and being movable outside of said chamber when in the extended position.

4. The invention in claim 2 wherein said third valve means includes a ball-like element whose specific gravity is less than that of said fuel, a valve seat so that the fuel forces said ball-like element against said valve seat.

5. The invention as in claim 3 including a spring urging said diaphragm in the contracted position.

6. Means for recycling surplus fuel left over in a fuel manifold and the like upon engine shutdown comprising: a normally closed drain plug, housing means defining an enclosed chamber, a movable wall in said chamber having one surface exposed to said surplus fuel and an opposing surface exposed to pressure, first, second, and third valve means in openings formed in said housing connecting said enclosed chamber to ambient, to said drain plug and to the engine fuel supply system, spring means for closing said third valve so that it opens soley when said surplus fuel is being urged out of said enclosed chamber respectively, said second valve and said third valve being closed by said surplus fuel when said surplus fuel exerts sufficient pressure to overcome said spring, and means interconnecting the engine starter and said wall means to supply pressure to position said wall so that said chamber is in the contracted state thereby forcing the surplus fuel to be recycled in the engine fuel system.

* * * * *

UNITED STATES PATENT AND TRADEMARK OFFICE
CERTIFICATE OF CORRECTION

PATENT NO. : 4,149,372
DATED : April 17, 1979
INVENTOR(S) : John C. Gavin, Clement A. Senatro It is certified that error appears in the above-identified patent and that said Letters Patent are hereby corrected as shown below:

Column 1, line 37, cancel "sized sufficiently cterized"

line 38, cancel "as being automatic, repeatable, and relatively simple"

line 39, cancel "with a relatively small drain tank,"

Column 4, line 32, cancel "compris-" and insert --,-- line 33, cancel "ing"

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*